United States Patent
Lee et al.

(10) Patent No.: US 7,264,170 B2
(45) Date of Patent: Sep. 4, 2007

(54) INPUT DEVICE AND ELECTRONIC DEVICE USING THE SAME

(75) Inventors: Pin-Chia Lee, Taipei (TW); Tzu-Ming Huang, Taipei (TW)

(73) Assignee: Inventec Appliances Corporation, Wu-Ku Hsiang, Taipei Hsieng (TW)

( * ) Notice: Subject to any disclaimer, the term of this patent is extended or adjusted under 35 U.S.C. 154(b) by 186 days.

(21) Appl. No.: 10/866,788

(22) Filed: Jun. 15, 2004

(65) Prior Publication Data

US 2005/0274785 A1    Dec. 15, 2005

(51) Int. Cl.
*G06K 7/10* (2006.01)
(52) U.S. Cl. .................. 235/472.01; 341/22; 345/156; 345/160
(58) Field of Classification Search ........... 235/472.01, 235/486; 345/156, 160, 169; 455/550.1, 455/561; 341/22
See application file for complete search history.

(56) References Cited

U.S. PATENT DOCUMENTS

| | | | | |
|---|---|---|---|---|
| 6,297,806 B1 * | 10/2001 | Skoog | ........................ | 345/160 |
| 6,593,914 B1 * | 7/2003 | Nuovo et al. | ................ | 345/169 |
| 6,810,271 B1 * | 10/2004 | Wood et al. | ................. | 455/566 |
| 2005/0079895 A1 * | 4/2005 | Kalenius et al. | ............. | 455/566 |

* cited by examiner

*Primary Examiner*—Ahshik Kim
(74) *Attorney, Agent, or Firm*—Birch, Stewart, Kolasch & Birch, LLP

(57) ABSTRACT

An input device. The input device may be coupled to an electronic device. The input device comprises a control capable of being moved to n activation points to respectively activate input functions, wherein n is an integer larger than or equal to ten. When activated, the input functions respectively enable n digits to be input to the electronic device.

15 Claims, 5 Drawing Sheets

INPUT DEVICE AND ELECTRONIC DEVICE USING THE SAME

BACKGROUND OF THE INVENTION

1. Field of the Invention

The present invention relates to an input device, and in particular to an input device comprising a control capable of moving between a plurality of activation points for triggering phone number digit input.

2. Description of the Related Art

Typically, a conventional mobile phone provides a keypad comprising numeric and other function keys. A user typically looks at the keypad when entering a phone number. This method, however, is impossible for the blind. Additionally, when driving, it is dangerous to look at a keypad when entering a phone number. Voice control functions provided by some mobile phones are easily interfered with by environmental noise and are thus impractical.

A keypad may be burdensome and add to the size of a mobile phone or encroach on the area available for the display. A keypad may also be difficult to use if too small.

In addition, when using a mobile phone with a hinged cover to enter a phone number, even if an earphone is provided, a mobile user must first open the hinged cover and look at the keypad when entering a phone number.

Hence, there is a need for a new input device for ameliorating the above-described disadvantages.

SUMMARY OF THE INVENTION

Accordingly, the invention provides an input device. The input device may be coupled to an electronic device. The input device comprises a control capable of being moved to n activation points to respectively activate input functions, wherein n is an integer larger than or equal to ten. When activated, the input functions respectively enable n phone number digits to be input to the electronic device.

In addition, the invention provides an electronic device. The electronic device comprises an input device coupled to the electronic device. The input device comprises a control capable of being moved to n activation points to respectively activate input functions, wherein n is an integer larger than or equal to ten. When activated, the input functions respectively enable n phone number digits to be input to the electronic device.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION OF THE INVENTION

The present invention provides an input device for ameliorating the previously described disadvantages.

First Embodiment

Figure 1:
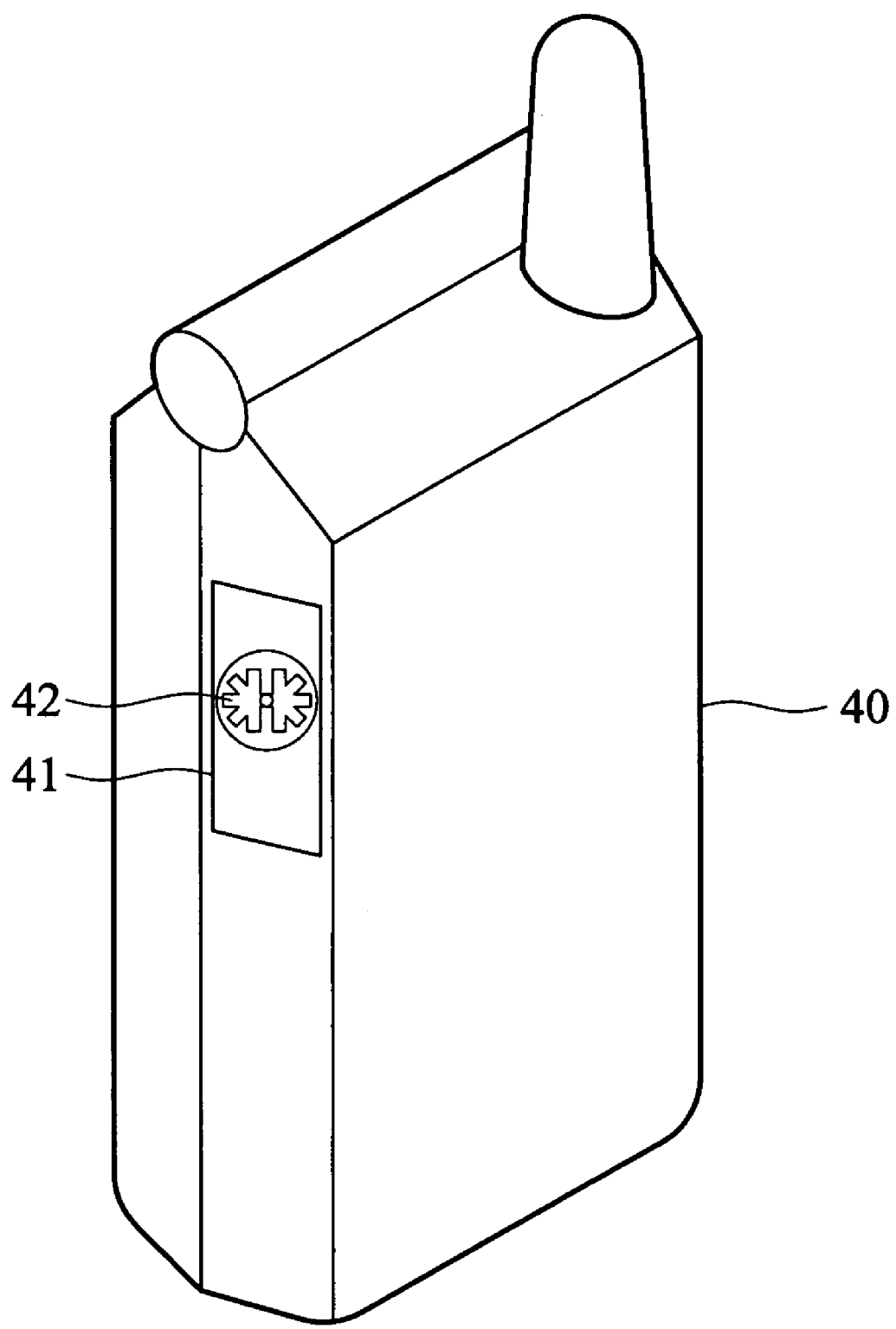
FIG. 1 is a schematic diagram of a mobile phone according to the first embodiment of the invention.

FIG. 1 is a schematic diagram of a mobile phone 40 of the invention. Mobile phone 40 is provided with a hinged cover. The arrangement wherein mobile phone 40 comprises an input device 42 located in area 41, as shown in FIG. 1, enables entry of phone numbers using the input device 42 without first opening the hinged cover. Mobile phone 40 is illustrated as an example of an electronic device with the input device 42 of the invention. It is noted that this is not intended to limit the invention. The input device of the invention can be located at any other portion of mobile phone 40 or other electronic device, such as a personal digital assistant.

The input device 42 of the invention can be implemented using a channel structure of a specific shape, and input is accomplished via a movable control disposed therein.

Figure 2A:
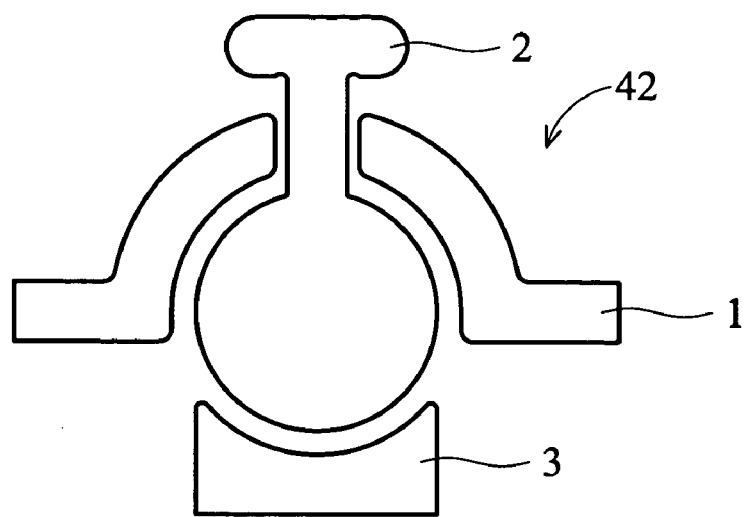
FIG. 2a is a cross-section of an input device of the first embodiment of the invention.

FIG. 2a is a cross-section of an input device 42 of the first embodiment of the invention. Input device 42 comprises a cover 1, control 2 and a receptacle 3. Control 2 comprises a T shaped structure with a spherical base. The T shape structure acts as a movable lever while the spherical base enables movement of control 2 in various directions. The receptacle 3 receives the spherical structure, and comprises a switch for activating a function. The function is activated when receptacle 3 receives pressure exerted via control 2 when pressed. In the embodiment, the function comprises calling a phone number. The surface of the spherical structure of control ball 2 and the surface of receptacle 3 may be smooth for reducing friction. A lubricant may also be used.

Figure 2B:
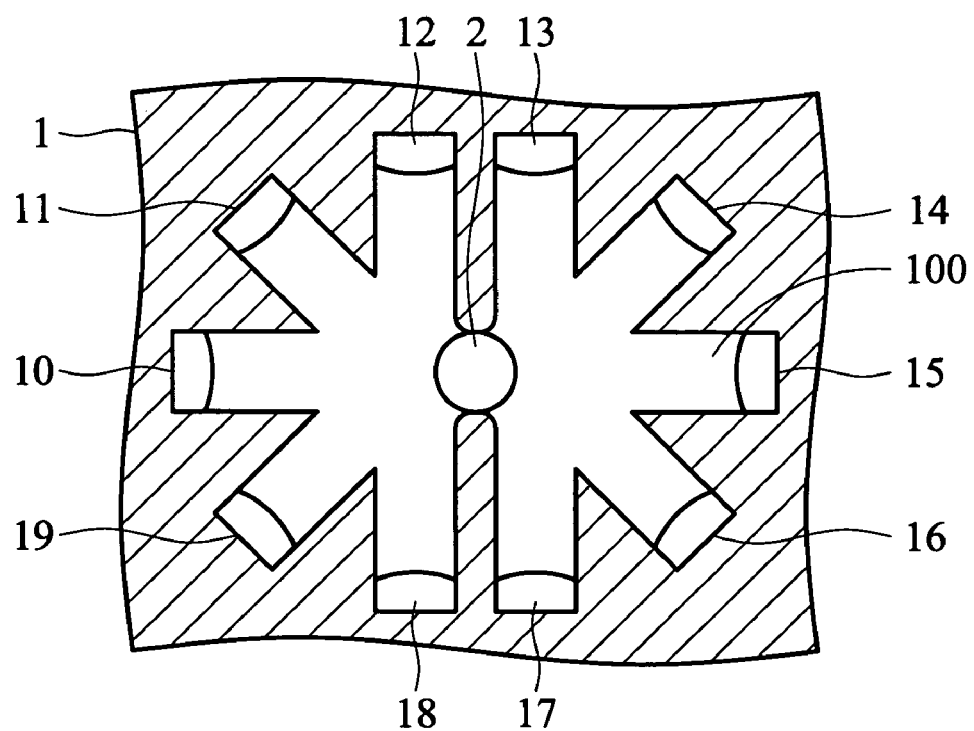
FIG. 2b is a schematic diagram of a top view of an input device in the first embodiment of the invention.

FIG. 2b is a schematic diagram of a top view of the input device 42 in the first embodiment of the invention. A hollow area enclosed by cover 1 comprises a channel structure 100. Channel structure 100 comprises a longer horizontal track, two vertical tracks, an upper-left track, a lower-left track, an upper-right track and a lower-right track. The two vertical tracks cross the horizontal track at a left cross point and a right cross point respectively. The upper-left track extends from the left cross point in an upper-left direction. The lower-left track extends from the left cross point in a lower-left direction. The upper-right track extends from the right cross point in an upper-right direction. The lower-right track extends from the right cross point in a lower-right direction. Channel structure 100 comprises ten end points. Five end points thereof respectively comprise end points of tracks extending radially from the left cross point. The other five end points thereof comprise end points of tracks extending radially from the right cross point respectively. As shown in FIG. 2b, a plurality of switches serving as activation points are located below cover 1 and correspond to the ten end points. The ten switches comprise buttons 10-19. In the first embodiment, buttons 10-19 are respectively capable of activating ten input functions for inputting digits "0" to "9" to mobile phone 40. The correspondence of digits and buttons as described above is not intended to limit the invention. The object of entering phone numbers can be achieved even if the correspondence of digits and buttons is changed.

When a user moves control 2 along a track in channel structure 100 to an end point, a button corresponding to the end point is pressed, and a digit corresponding thereto is input to the mobile phone 40.

Hence, different digits are distinguishable and can be input by moving control 2 along different tracks of channel structure 100 to different end points. The structure enables correct entry of a phone number even if the user does not look at the input device 42 when dialing. Additionally, the arrangement wherein input device 42 is located at an outer side of mobile phone 40 enables a phone number to be entered without opening the hinged cover. Further, a phone number can be input to mobile phone 40 via control 2 and be called via mobile phone 40 when control 2 is pressed.

Second Embodiment

Figure 3:
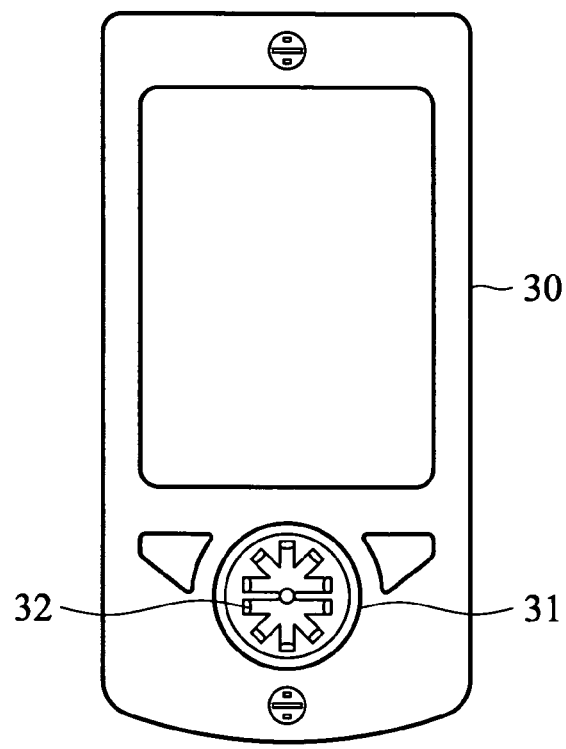
FIG. 3 is a schematic diagram of a mobile phone of the second embodiment of the invention.

FIG. 3 is a schematic diagram of a mobile phone 30 of the second embodiment of the invention. As shown in FIG. 3, mobile phone 30 comprises an input device 32 located in an area 31 thereof for replacing a conventional keypad. Input device 32 may be implemented in a small area as it comprises only one control leaving the remaining are free for a large display.

Figure 4:
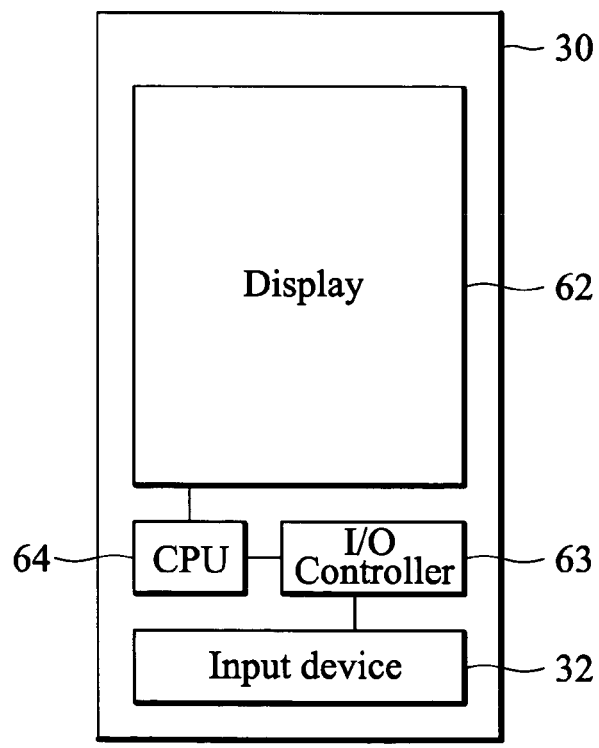
FIG. 4 is a block diagram of the configuration of mobile phone 30 in the second embodiment of the invention.

FIG. 4 is a block diagram of the configuration of mobile phone 30 in the second embodiment of the invention. Mobile phone 30 comprises a display 62, a central processing unit (CPU) 1, an input/output (I/O) controller 63, and an input device 32. Input device 32 couples to I/O controller 63. CPU 1 couples to display 62 and, I/O controller 63.

Figure 5A:
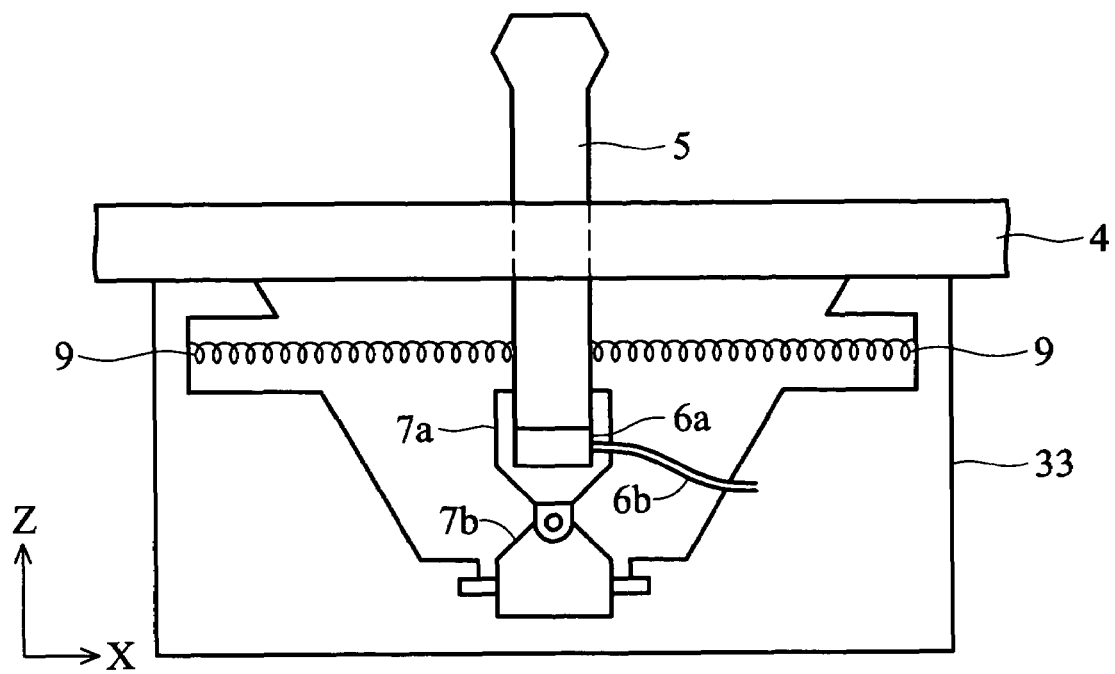
FIG. 5a is a cross-section of an input device of the second embodiment of the invention.

FIG. 5a is a cross-section of input device 32 of the second embodiment of the invention. Input device 32 comprises cover 4, lever 5, receptacle 6a bearing the base of lever 5, wire 6b, x-direction joint 7a, y-direction joint 7b, spring combination 9, and base 33.

A user of mobile phone 30 may move lever 5 by finger.

Figure 5B:
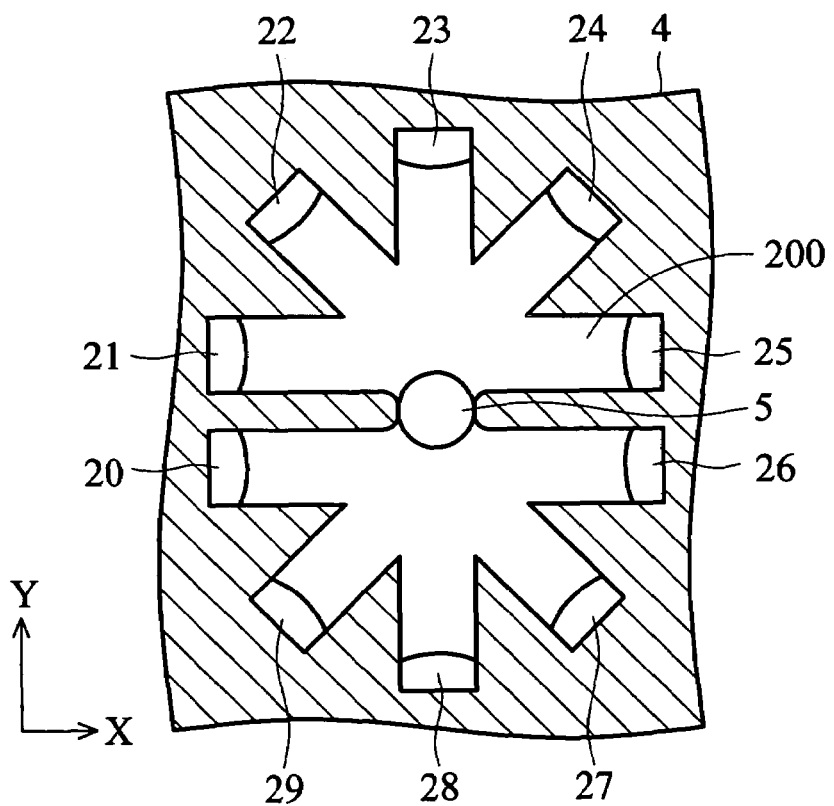
FIG. 5b is a schematic diagram of a top view of the input device in the second embodiment of the invention.

FIG. 5b is a schematic diagram of a top view of the input device 32 in the second embodiment of the invention. A hollow area enclosed by cover 4 in FIG. 5b comprises channel structure 200 of a specific shape for directing movement of lever 5. Receptacle 6a bears lever 5. Receptacle 6a comprises a wire 6b coupling to I/O controller 63 of mobile phone 30. Receptacle 6a activates a function when pressed. X-direction joint 7a bears lever 5 and receptacle 6a and pivots y-direction joint through an axle parallel to direction y. X-direction joint 7a enables the lever 5 to move along or against direction x. Direction x is perpendicular to direction z, as shown in FIG. 5a. Direction x is perpendicular to direction y, as shown in FIG. 5b. Direction y is perpendicular to directions x and z. Y-direction joint 7b pivots base 33 through an axle parallel to direction x. Y-direction joint 7b enables the lever 5 to move along or against direction y. X-direction joint 7a and y-direction joint 7b enable lever 5 to be moved in any direction. Spring combination 9 enables lever 5 to return to a central position corresponding to the center of channel structure 200 when lever 5 is released. Two springs of spring combination 9 may be located in direction x and y respectively.

Channel structure 200 comprises a longer vertical track, two horizontal tracks, an upper-left track, an upper-right track, a lower-left track and a lower-right track.

The two horizontal tracks cross the vertical track at an upper cross point and a lower cross point respectively. The upper-left track extends from the upper cross point in an upper-left direction. The upper-right track extends from the upper cross point in an upper-right direction. The lower-left track extends from the lower cross point in a lower-left direction. The lower-right track extends from the lower cross point in a lower-right direction. Thus, channel structure 200 comprises ten end points. Five end points thereof comprise end points of tracks extending radially from the upper cross point respectively. The other five end points thereof comprise end points of tracks extending radially from the lower cross point respectively, as shown in FIG. 5b.

When input device 32 is implemented in a joystick generating digital signals, ten buttons 20-29 serving as activation points of lever 5 are located below cover 4 and correspond to the end points. In the second embodiment, the buttons 20-29, when pressed, activate ten input functions respectively for inputting digits "0" to "9" to mobile phone 30.

When a user moves lever 5 along different tracks of channel structure 200 to an end point of a track, a button corresponding to the end point is pressed by lever 5, and a digit corresponding thereto is input to the mobile phone 30. In the embodiment, buttons 20-29 couple to I/O controller 63 through wires (not shown). When detecting that one of the buttons 20-29 is pressed, I/O controller 63 generates an input signal for inputting a digit corresponding to the pressed button to CPU 64. CPU 64 receives the input signal and displays the input digit on display 62.

Hence, a user can distinguish different digits and move lever 5 along with different tracks of channel structure 200 to different end points corresponding thereto to input a phone number.

When the function of receptacle 6a comprises a calling function, pressing the lever 5 initiates a call through mobile phone 30, wherein the phone number is input via input device 32.

When input device 32 is implemented as a joystick generating analog signals, the object of the invention can be achieved by a storage medium storing a computer application for performing the following method.

Figure 6:
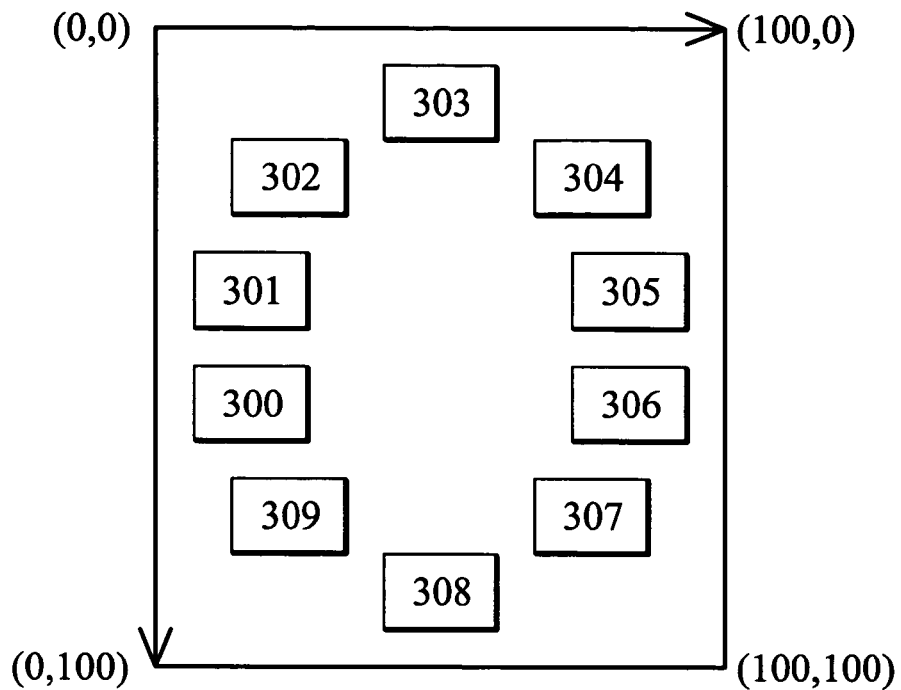
FIG. 6 is a coordinate plane of the second embodiment of the invention.

Ten coordinate areas are defined to correspond to ten functions for inputting distinct digits. FIG. 6 is a coordinate plane representing universal positions corresponding to lever 5. Coordinate areas 300-309 are defined as acceptable ranges of coordinates of lever 5 at ten end points respectively. Coordinate areas 300-309 comprise activation points and correspond respectively to input functions for input of digits "0" to "9" to mobile phone 30.

When lever 5 is moved to an end point, and the coordinate corresponding to the position of lever 5 falls in coordinate area 300, digit "0" is input to mobile phone 30. For defining digit input frequency, digit "0" is input to mobile phone 30 once a second until position of lever 5 is no longer in coordinate area 300. Similarly, when lever 5 is moved to another end point, and the coordinate corresponding thereto falls in another of coordinate areas 300-309, a corresponding digit is input to mobile phone 30 accordingly.

Input mechanism of input device 32 may be amended variously. For example, another digit input mechanism is described in the following. Lever 5 must be moved to an end point and pressed to trigger receptacle 6a to input a digit. The calling function is triggered by pressing receptacle 6a twice.

Figure 7:
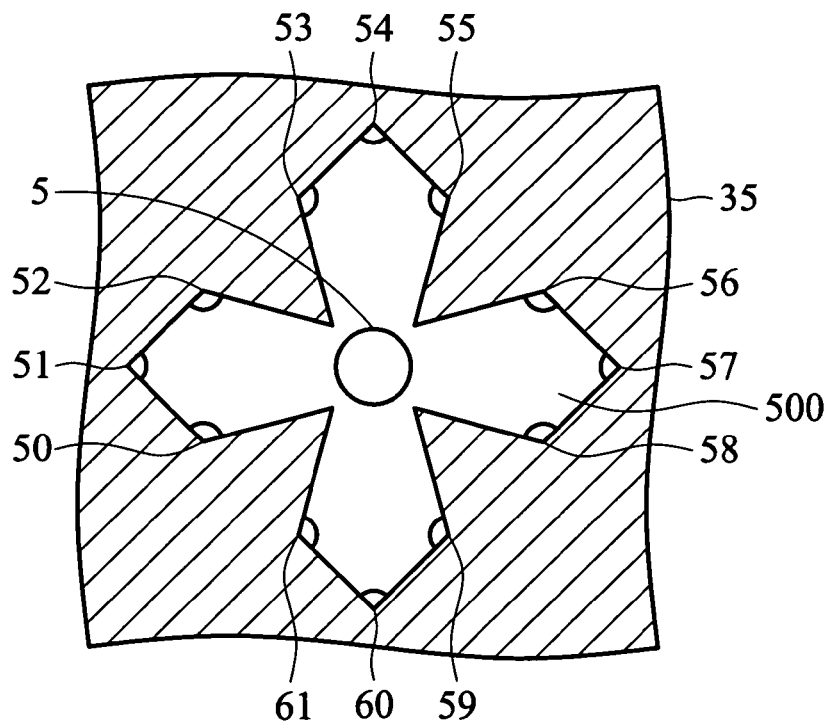
FIG. 7 is a schematic diagram of a top view of an input device of the invention.

The shape of the hollow area of cover 4 may be changed to accommodate a different channel structure and different operating style for lever 5. Then number of activation points implemented in buttons or coordinate areas may be more than ten. FIG. 7 is a schematic diagram of a top view of an input device of the invention. A hollow area enclosed by the cover 35 comprises a channel structure 500. The specific shape of channel structure 500 comprises four arms extending from a central position thereof in four directions. The outer portion of each arm comprises three angles, as shown in FIG. 7. A total of 12 angles are provided for locating activation points. Buttons 50-61 serving as activation points are located at the angles. Buttons 50-61 may respectively correspond to 12 input functions for inputting digits "0" to "9" and symbols "#" and "*".

Digit tones may be adopted to ameliorate the risk of dialing wrong number. A digit tone may sound when lever 5 is near an activation point.

In conclusion, the invention eliminates the need to look at the display of a mobile phone when dialing. The input device of the invention comprises a control, thus eliminating the need for a keypad providing more available area for a display.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An input device, coupled to an electronic device, comprising: a lever, the lever being movably disposed in a channel structure having n activation points, capable of activating a function when pressed, and capable of being moved along the channel structure to n activation points to respectively activate n input functions for respectively inputting n digits to the electronic device, wherein n is an integer not less than ten.

2. The device as claimed in claim 1, wherein the n digits comprise 0 to 9.

3. The device as claimed in claim 1, wherein the function is calling a phone number input by the lever via the electronic device.

4. The device as claimed in claim 1, wherein the channel structure comprises a longer horizontal track, two vertical tracks crossing the horizontal track at a left cross point and a right cross point respectively, an upper-left track extending from the left cross point in an upper-direction, a lower-left track extending from the left cross point in a lower-left direction, an upper-right track extending from the right cross point in an upper-right direction and a lower-right track extending the right cross point in a lower-right direction, and the channel structure comprises ten end points.

5. The device as claimed in claim 4, wherein the n activation points comprisse ten activation points and are located corresponding to the ten end points.

6. The device as claimed in claim 1, wherein the channel structure comprises a longer vertical track, two horizontal tracks crossing the vertical track in a upper cross point and a lower cross point respectively, an upper-left track extending from the upper cross point in an upper-left direction, an upper-right track extending from the upper cross point in an upper-right direction, a lower-left track extending from the lower cross point in a lower-left direction and a lower-right track extending from the lower cross point in a lower-right direction, and the channel structure comprises ten end points.

7. The device as claimed in claim 6, wherein the n activation points comprinse ten activation points and are located corresponding to the ten end points.

8. An electronic device, comprising an input device coupled to the electronic device, wherein the input device comprises a lever, The being movably disposed in a channel structure, capable of activating a function when pressed, and capable of being moved along the channel structure to n activation points for respectively activating n input fractions for inputting n digits to the electronic device, wherein n is an integer not less than ten.

9. The device as claimed in claim 8, wherein the a digits comprise 0 to 9.

10. The device as claimed in claim 8, wherein the function is calling a phone number input by the input device through the electronic device.

11. The device as claimed in claim 8, wherein the channel structure comprises a longer horizontal track, two vertical tracks crossing the horizontal track at a left cross point and a right cross point respectively, an upper-left track extending from the left cross point in an upper-left direction, a lower-left track extending from the left cross point in a lower-left direction, an upper-right track extending from the right cross point in an upper-right direction and a lower-fight track extending from the right cross point in a lower-right direction, and the channel structure comprises ten end points.

12. The device as claimed in claim 11, wherein the n activation points comprise ten activation points and are located corresponding to the ten end points.

13. The device as claimed in claim 8, wherein the channel structure comprises a longer vertical track, two horizontal tracks crossing the vertical track at an upper cross point and a lower cross point respectively, an upper-left track extending from the upper cross point in an upper-left direction, an upper-right track extending from the upper cross point in an upper-right direction, a lower-left track extending from the lower cross point in a lower-left direction and a lower-right track extending from the lower cross point in a lower-right direction, and the channel structure comprises ten end points.

14. The device as claimed in claim 13, wherein the n activation points comprise ten activation points and are located corresponding to the ten end points.

15. The device as claimed in claim 8, wherein the electronic device comprises a mobile communication device.

* * * * *